(12) United States Patent  
Sato et al.

(10) Patent No.: US 8,745,673 B2  
(45) Date of Patent: Jun. 3, 2014

(54) WIRELESS VIDEO TRANSMISSION DEVICE, WIRELESS VIDEO RECEPTION DEVICE AND WIRELESS VIDEO COMMUNICATION SYSTEM USING SAME

(75) Inventors: Masaki Sato, Fukuoka (JP); Takeshi Miyagoshi, Fukuoka (JP); Masaaki Endo, Fukuoka (JP)

(73) Assignee: Panasonic Corporation, Osaka (JP)

( * ) Notice: Subject to any disclaimer, the term of this patent is extended or adjusted under 35 U.S.C. 154(b) by 119 days.

(21) Appl. No.: 13/641,644

(22) PCT Filed: Mar. 2, 2012

(86) PCT No.: PCT/JP2012/001437  
§ 371 (c)(1),  
(2), (4) Date: Oct. 16, 2012

(87) PCT Pub. No.: WO2012/124276  
PCT Pub. Date: Sep. 20, 2012

(65) Prior Publication Data  
US 2013/0042279 A1 Feb. 14, 2013

(30) Foreign Application Priority Data  
Mar. 11, 2011 (JP) ................................ 2011-054652

(51) Int. Cl.  
*H04N 7/16* (2011.01)  
*G06F 15/16* (2006.01)  
*H04W 4/00* (2009.01)  
*H04W 36/00* (2009.01)  
*H04W 74/00* (2009.01)

(52) U.S. Cl.  
USPC ............. 725/62; 455/436; 455/437; 455/455; 370/331; 370/332; 370/333; 709/231

(58) Field of Classification Search  
CPC ............ H04N 21/2187; H04N 21/631; H04N 19/00454; H04N 19/637; H04N 19/6437; H04W 36/0083; H04W 36/18; H04W 36/08; H04W 40/12; H04W 88/06; H04W 88/10; H04W 88/12  
USPC .................... 725/62; 370/331–333, 340–341; 455/436–443, 455; 709/231  
See application file for complete search history.

(56) References Cited

U.S. PATENT DOCUMENTS 5,481,312 A * 1/1996 Cash et al. .................... 348/465

(Continued)

FOREIGN PATENT DOCUMENTS

| JP | 2000-102050 | 4/2000 |
|---|---|---|
| JP | 2003-152626 | 5/2003 |

(Continued)

OTHER PUBLICATIONS

International Search Report dated Mar. 27, 2012.

*Primary Examiner* — Hai V Tran  
(74) *Attorney, Agent, or Firm* — Dickinson Wright PLLC

(57) ABSTRACT

In a wireless video communication system, a wireless camera has an image capturing unit for generating video data, a video clipping unit for generating high priority video data and lower priority video data having mutually different image regions from the video data, a first and a second wireless communication unit for communicating with a first and a second access point and a communication control unit for controlling the wireless communication by the first and second wireless communication units. The communication control unit can cause the high priority video data and lower priority video data to be transmitted from the first and second wireless communication units as two individual video streams, and is configured to determine whether each wireless communication unit should transmit none, one or both of the video streams depending on the wireless communication quality and the condition of a handover.

10 Claims, 10 Drawing Sheets

(56) References Cited

U.S. PATENT DOCUMENTS

| | | | | |
|---|---|---|---|---|
| 5,784,695 | A | * | 7/1998 | Upton et al. .................. 455/442 |
| 2004/0261113 | A1 | * | 12/2004 | Paul et al. ....................... 725/90 |
| 2005/0105807 | A1 | | 5/2005 | Suino |
| 2005/0213538 | A1 | | 9/2005 | Ebiko |

FOREIGN PATENT DOCUMENTS

| | | |
|---|---|---|
| JP | 2003-309594 | 10/2003 |
| JP | 2004-128579 | 4/2004 |
| JP | 2005-094578 | 4/2005 |
| JP | 2008-005418 | 1/2008 |

* cited by examiner

Fig.4

(A) | I picture | P picture | P picture |

(B) | coordinate information | I picture | coordinate information | P picture | coordinate information | P picture |

Fig.9
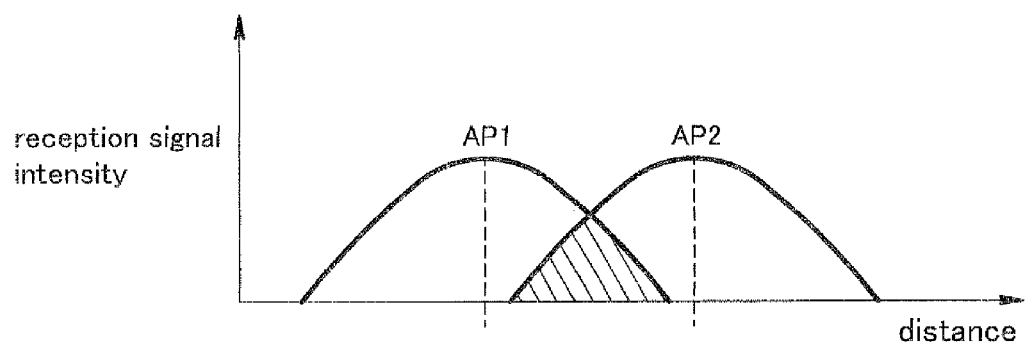
(A)
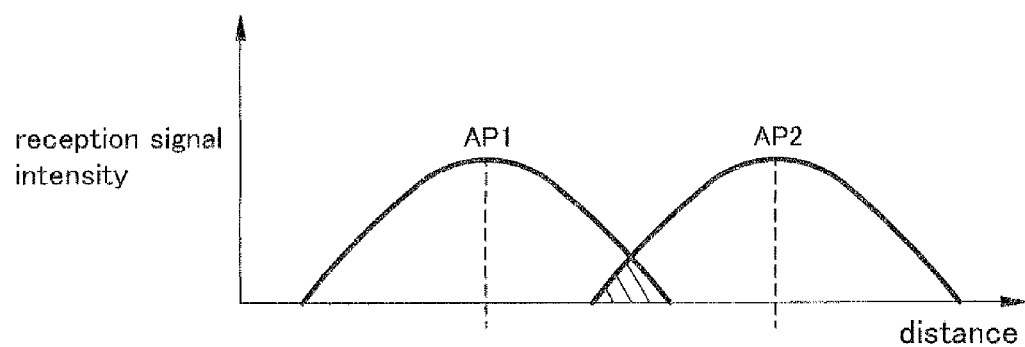
(B)

WIRELESS VIDEO TRANSMISSION DEVICE, WIRELESS VIDEO RECEPTION DEVICE AND WIRELESS VIDEO COMMUNICATION SYSTEM USING SAME

TECHNICAL FIELD

The present invention relates to a wireless video transmission device, a wireless video reception device and a wireless video communication system using these devices that allow video signals to be transmitted and received via wireless communication by switching from one access point (base station) to another.

BACKGROUND OF THE INVENTION

In a mobile communication system, each mobile terminal such as a mobile phone is enabled to continue a wireless communication over a wide area by handover or by switching from one access point to another while the mobile terminal is in movement. In such a mobile communication system, the communication quality may be deteriorated at or near the boundary of the cover area (the range of wireless communication) of each access point, and the communication may be temporarily interrupted during the process of the handover. In particular, it is essential for systems that transmit video signals to take appropriate measures against such problems as the amount of info nation that is to be transmitted is greater as compared to systems for transmitting speech signals.

In the field of video communication systems, it is known to divide each still image frame of a video signal into a plurality of blocks, classify the blocks into blocks of interest and blocks of non-interest according to the importance of each block and reduce the amounts of codes preferentially for blocks of non-interest when the amounts of codes are required to be reduced so that at least the essential part of the video signal may be retrieved at a high quality even when the quality of communication is deteriorated. See Patent Document 1.

It is also known to provide each mobile terminal with a pair of transmission/reception units for communicating with the base stations, and cause one of the transmission/reception units which is not engaged in the communication with the handover source base station to exchange the control signal required for the handover with the handover target base station so that the time period of interruption in the communication at the time of the handover may be minimized. See Patent Document 2.

PRIOR ART DOCUMENT(S)

Patent Document(s)

Patent Document 1: JP 2005-094578
Patent Document 2: JP 2000-102050

BRIEF SUMMARY OF THE INVENTION

Task to be Accomplished by the Invention

The prior art disclosed in Patent Document 1 which generates a stream by preferentially reducing the amounts of codes for blocks of non-interest in the encoding process may be effective in systems where video signals are distributed from a video server to client devices, but suffers from the problem that the range of the amounts of codes that can be controlled depending on the communication quality is so limited that this technology may not be effectively used in mobile communication such as those using wireless LAN (local area network) access points.

The prior art disclosed in Patent Document 2 may be able to reduce the time periods of communication interruption when performing the handover by using the two transmission/reception units in a network such as PHS (Personal Handyphone System) where the bandwidth is guaranteed by the provider, but may be unable to ensure a high quality communication in mobile communications such as those using wireless LAN access points that do not have the benefit of bandwidth guarantee.

The present invention was made in view of such problems of the prior art, and has a primary object to provide a wireless video transmission device, a wireless video reception device and a wireless video communication system using these devices that can avoid garbling and deterioration of video signals and ensure a high quality video communication even at the time of handover or poor communication quality which may occur at or near the boundary of the cover area of each access point.

Means to Accomplish the Task

The wireless video transmission device of the present invention comprises an image capturing unit for capturing an image of an object and generating a corresponding video data; a data generating unit for generating high priority video data and low priority video data having at least different image regions or image resolutions according to the video data; a video encoding unit for encoding the high priority video data and the low priority video data; a first wireless communication unit for communicating with a first access point; a second wireless communication unit for communicating with a second access point serving as a candidate for a handover destination from the first access point; and a communication control unit for controlling wireless communication operations of the first and second wireless communication units; wherein the communication control unit determines if a transmission is to be made for each of the first and second wireless communication units according to a quality of communication with the first access point and a status of handover to the second access point, and transmits the encoded high priority video data and low priority video data from the first and second wireless communication units as two individual video streams.

Effect of the Invention

The present invention thus avoids garbling and deterioration of video signals and ensures a high quality video communication even at the time of handover or poor communication quality which may occur at or near the boundary of the cover area of each access point.

BRIEF DESCRIPTION OF THE DRAWINGS

FIG. 4 is a diagram showing the structure of the data Coded by a video encoding unit 13;

FIG. 9 is a diagram showing the relationship between the two access points AP1 and AP2 and the reception signal intensity in the wireless video communication system 1, (A) representing the case where the distance between the access points is small, and (B) the case where the distance between the access points is large.

DETAILED DESCRIPTION OF THE PREFERRED EMBODIMENT(S)

Figure 1:
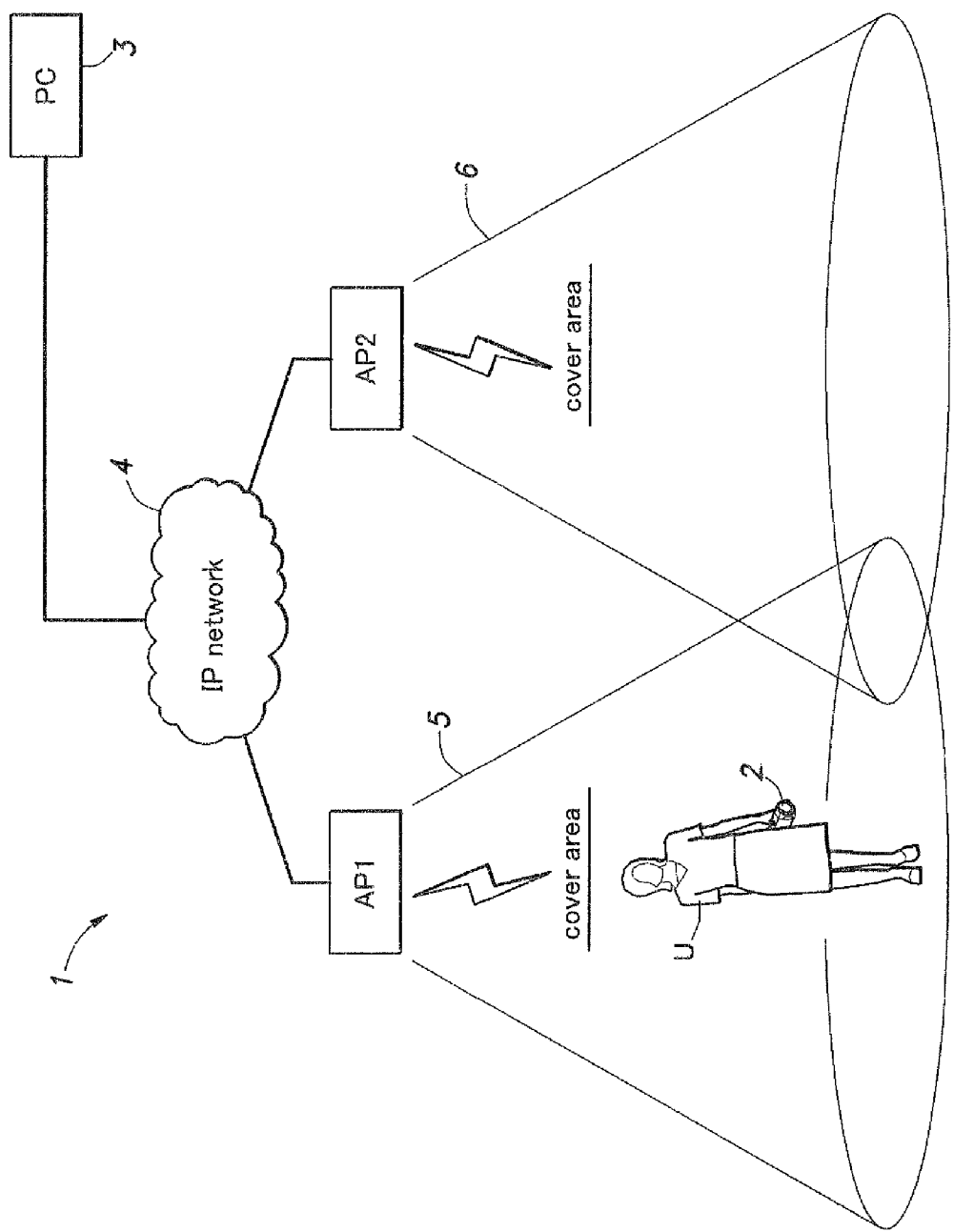
FIG. 1 is a schematic block diagram of a wireless video communication system 1 embodying the present invention.

The first invention made with the aim of achieving such an object consists of a wireless video transmission device, comprising: an image capturing unit for capturing an image of an object and generating a corresponding video data; a data generating unit for generating high priority video data and low priority video data having at least different image regions or image resolutions according to the video data; a video encoding unit for encoding the high priority video data and the low priority video data; a first wireless communication unit for communicating with a first access point; a second wireless communication unit for communicating with a second access point serving as a candidate for a handover destination from the first access point; and a communication control unit for controlling wireless communication operations of the first and second wireless communication units; wherein the communication control unit determines if a transmission is to be made for each of the first and second wireless communication units according to a quality of communication with the first access point and a status of handover to the second access point, and transmits the encoded high priority video data and low priority video data from the first and second wireless communication units as two individual video streams.

Thereby, the high priority video data and the low priority video data are transmitted as individual video streams, and whether a transmission is to be made for each of the first and second wireless communication units is determined according to a quality of communication with the first access point and a status of handover to the second access point, the amounts of codes for the high priority video data and the low priority video data can be individually controlled, and this allows the range of the amounts of codes that can be controlled to be expanded. Therefore, even at the time of handover or when the communication quality gets poor near the boundary of an access point, the garbling of the video data and the deterioration of the image quality can be avoided, and the transmission of high quality video data can be made possible.

According to the second invention, in the wireless video transmission device of the first invention, the communication control unit causes both of the video streams to be transmitted from the first wireless communication unit to the first access point when the quality of communication does not meet a first reference criterion as to whether a transmission is to be made.

Thereby, the signal receiving side is allowed to use one or both of the high priority video data and the low priority video data for display depending on the condition of the reception of the video streams so that the transmission of high quality video data is ensured even when the condition of communication is poor in the part near the boundary of the cover area of the first access point.

According to the third invention, in the wireless video transmission device of the second invention, the communication control unit causes one of the video streams to be transmitted from the second wireless communication unit to the second access point when the quality of communication does not meet a second reference criterion which is poorer than the first reference criterion.

Thereby, because the transmission of a video stream to the second access point serving as a candidate for the next handover destination is already in progress prior to the handover, the transmission of high quality video data can be maintained during the progress of the handover.

According to the fourth invention, in the wireless video transmission device of any of the first to the third inventions, the communication control unit stops the transmission of the two video streams to the first access point and causes the second wireless communication unit to transmit both of the video streams to the second access point upon completion of a handover from the first access point to the second access point.

Thereby, the signal receiving side is allowed to use one or both of the high priority video data and the low priority video data for display depending on the condition of the reception of the video streams so that the transmission of high quality video data is ensured even when the condition of communication is poor in the part near the boundary of the cover area of the second access point upon completion of the handover.

According to the fifth invention which consists of a wireless video reception device configured to communicate with the wireless video transmission device according to any one of the first to the fourth inventions, the wireless video reception device comprises a data reception unit for receiving the two video streams transmitted from the wireless video transmission device via the first and second access points; and a video decoding unit for decoding video data contained in at least one of the received video streams.

Thereby, a plurality of different sets of video data can be used for display depending on the communication condition of the video streams so that the garbling of the video data and the degradation of image quality can be avoided, and the transmission of high quality video data can be ensured even when the condition of communication is poor in the area near the boundary of the access point.

According to the sixth invention, in the wireless video reception device according to the fifth invention, the wireless video reception device further comprises a handover completion notification unit for notifying a completion of a handover to the second access point to the wireless video reception device.

Thereby, the transmitting side (wireless video transmission device) is allowed to be informed of the timing of the completion of the handover so that the transmission of high quality video data is enabled.

According to the seventh invention, in the wireless video reception device according to the fifth or sixth invention, the data reception unit further comprises a stream selection unit for selecting a video stream to be decoded by the video decoding unit according to a reception condition of each video stream when a plurality of video streams of a same kind are received.

Thereby, the video data is reproduced from the video stream received in a favorable communication condition so that the transmission of high quality video data is enabled.

According to the seventh invention, in the wireless video reception device according to the fifth or sixth invention, further the wireless video reception device further comprises a display unit, wherein a display position of a high priority image during a handover is fixed depending on the quality of communication.

Thereby, because a display position of a high priority image during a handover is fixed depending on the quality of communication, a favorable video image can be displayed even when the condition of wireless communication is poor.

The ninth invention consists of a wireless video transmission system comprising the wireless video transmission device according to any of the first to the fourth inventions, and the wireless video reception device according to any of the fifth to the eighth inventions.

Now a preferred embodiment of the present invention is described in the following with reference to the drawings.

FIG. 1 is a schematic block diagram of a wireless video communication system 1 embodying the present invention. The wireless video communication system 1 essentially consists of a wireless camera 2 serving as a wireless video transmission device for transmitting a video signal via wireless communication, and a PC (personal computer) 3 serving as a wireless video reception device for receiving the video signal transmitted from the wireless camera 2. The wireless camera 2 is configured to communicate with the PC 3 via a pair of access points AP1 and AP2 and an IP (Internet protocol) network 4. The IP network 4 consists of a LAN (local area network) based on a known network standard such as Ethernet (trademark), but may also consist of other forms of network such as a WAN (wide area network) and the Internet.

The access points AP1 and AP2 consist of two identical wireless relay units that can communicate with the wireless camera 2, and have cover areas 5 and 6 to allow communication with the wireless camera 2. These cover areas 5 and 6 partly overlap with each other at the boundaries thereof. This wireless video communication system 1 is configured such that the PC 3 is enabled to maintain a communication with the wireless camera 2 when a user U operating the wireless camera 2 moves from one of the cover areas to another by a handover process (or by switching from one of the access points AP1 and AP2 to the other).

Only the access point AP1 serving as a handover source access point and the access point AP2 serving as a handover target access point are mentioned in the following example for the convenience description, but there should be more numerous access points and cover areas for practical view points.

Figure 2:
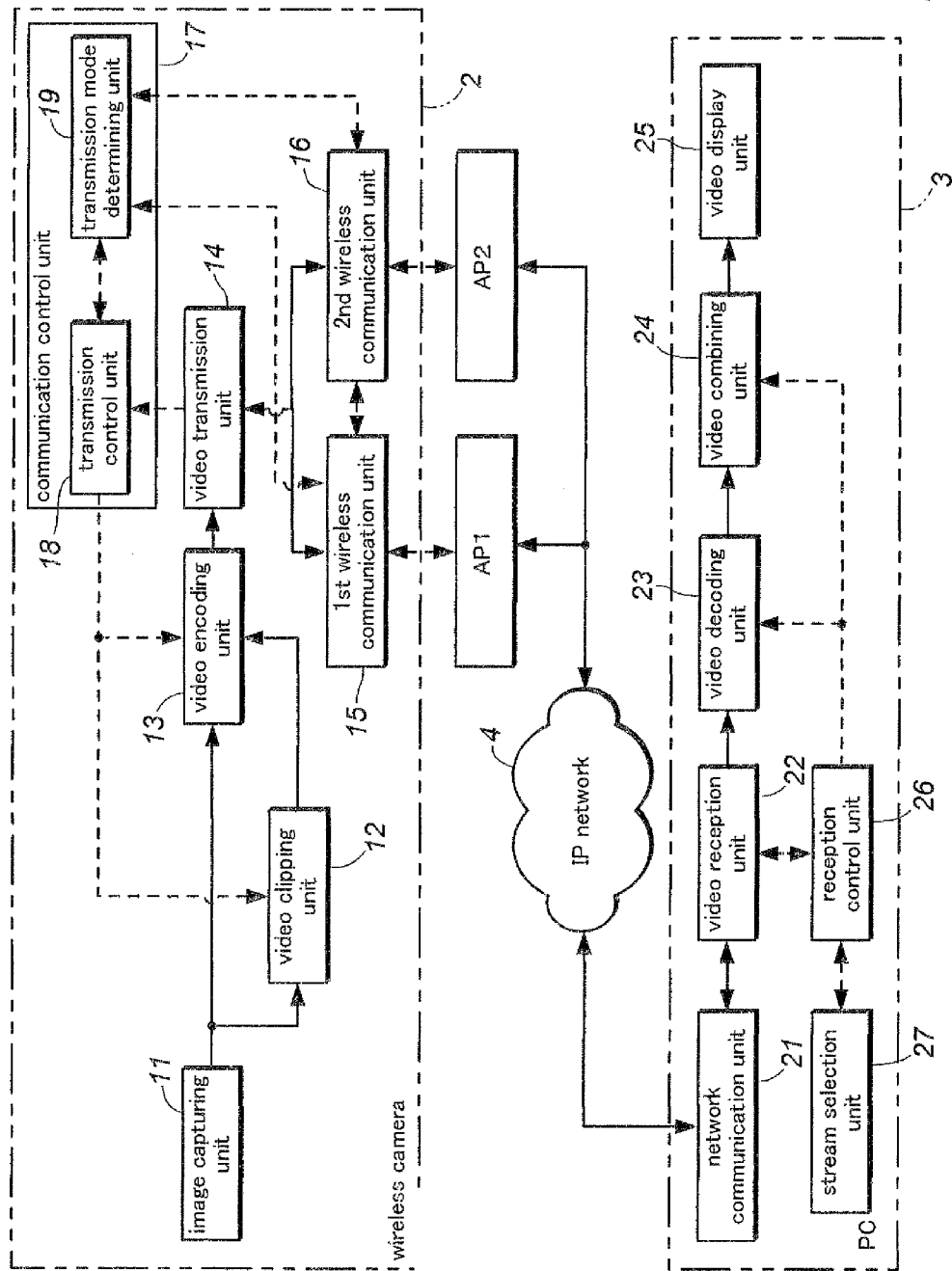
FIG. 2 is a block diagram showing the more detailed structure of the wireless video communication system 1.
Figure 3:
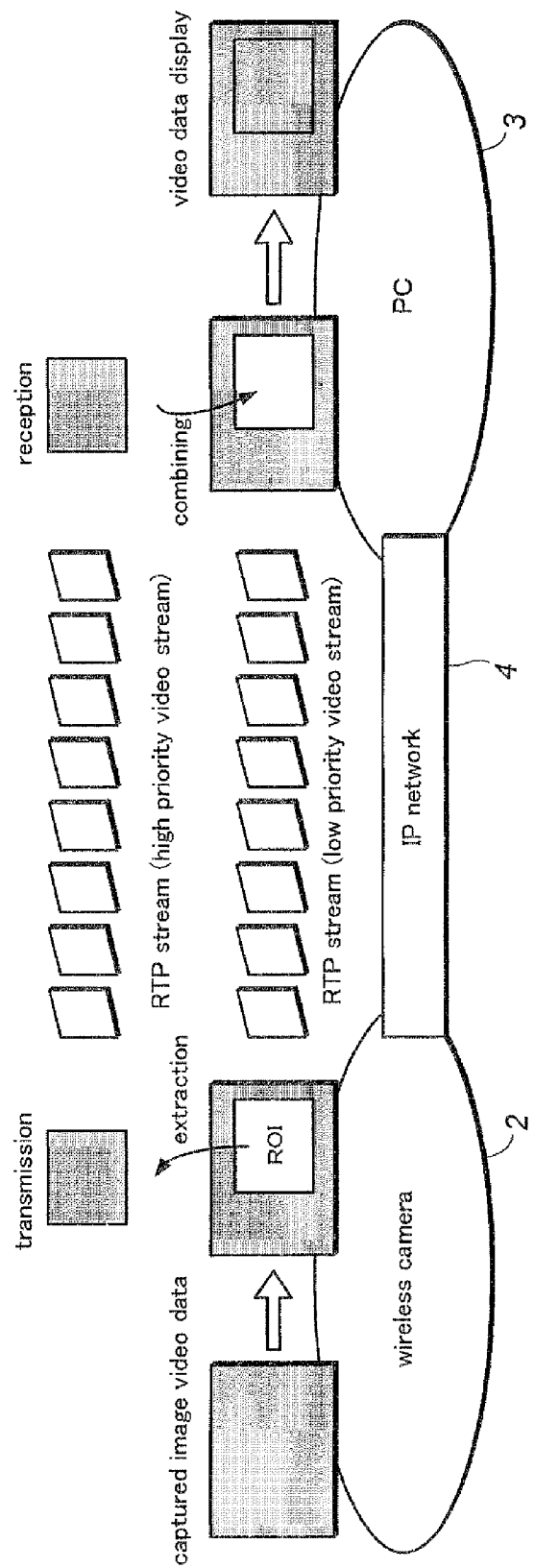
FIG. 3 is a schematic diagram showing an exemplary process of transmitting video streams in the wireless video communication system 1.
Figure 5:
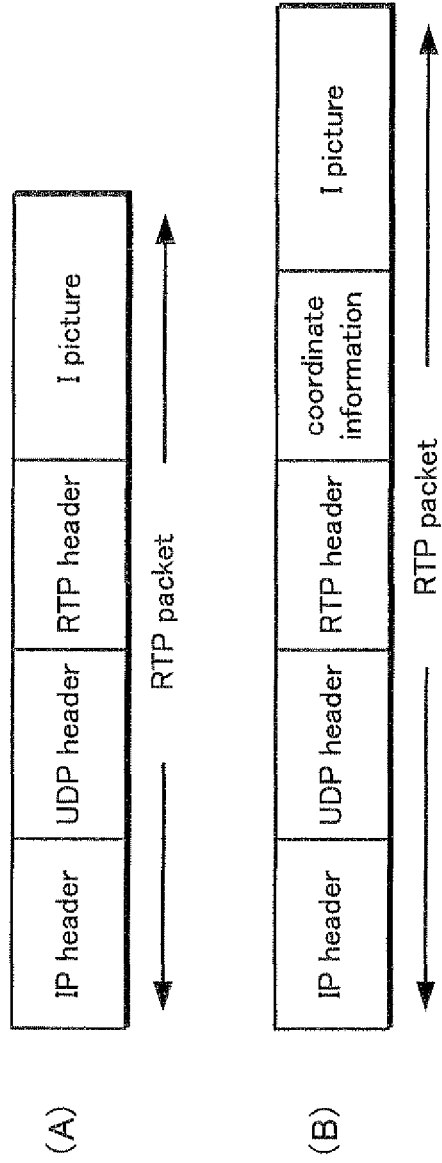
FIG. 5 is a diagram showing the structure of the transmission data of a video transmitting unit 14.

FIG. 2 is a block diagram showing the more detailed structure of the wireless video communication system 1, FIG. 3 is a schematic diagram showing an exemplary process of transmitting video streams in the wireless video communication system 1, FIG. 4 is a diagram showing the structure of the data coded by a video encoding unit 13, and FIG. 5 is a diagram showing the structure of the transmission data of a video transmitting unit 14.

As shown in FIG. 2, the wireless camera 2 includes an image capturing unit 11 essentially consisting of an optical lens system and a solid state image capturing device such as CMOS (complementary metal oxide semiconductor image sensor) so that captured image video data (video signal) can be generated by capturing an object image projected on an image capturing surface of the solid state image capturing device via the optical system.

As shown in FIG. 3, the video clipping unit 12 clips or extracts a region of interest (ROI) from the captured image video data generated by the image capturing unit 11. The user can reserve a desired region of the image in advance as a region of interest. Alternatively, the user may select a region of interest from an image displayed by a video display unit 25 of the PC 3 as will be described hereinafter. Also, a moving object such as a human and an automobile in the video image may be automatically identified by a known image recognition without the intervention of the user, and the region containing the moving object may be selected as a region of interest.

A video encoding unit 13 encodes the ROI video data associated with the ROI and provided by the video clipping unit 12 and the captured image video data (consisting of the non-ROI video data associated with regions of non-interest such as the still background image outside of the ROI when the clipping by the video clipping unit 12 is performed) by using a suitable known compression encoding method such as MEPG2 (moving picture experts group phase 2). The video encoding unit 13 can control the amount of codes that is to be allocated to each of the pixel blocks of the regions of interest and regions of non-interest either in a mutually exclusive manner or in a partly overlapping manner.

The video encoding unit 13 performs the encoding process such that the amount of the generated codes corresponds to a target set by a transmission control unit 19 as will be described hereinafter. When the amount of the generated codes exceeds the target set by the transmission control unit 19, the captured image video data produced from the image capturing unit 11 is reduced in volume or the image resolution is reduced, and the encoding process is performed on the reduced captured image video data. By reducing the resolution of the captured image video data in this manner, the amount of codes that is to be generated can be controlled, and the amount of codes that is required to encode the regions of non-interest can be significantly reduced.

The captured image video data received by the video encoding unit 13 from the image capturing unit 11 is converted into a series of data containing images such as I pictures (intra pictures) and P pictures (predictive pictures) as shown in FIG. 4(A). From the ROI video data forwarded from the video clipping unit 12 to the video encoding unit 13, the video encoding unit 13 produces a series of data attached with position information on the position of the region of interest for each of the I pictures and P pictures as shown in FIG. 4(B).

A video transmission unit 14 converts the video data encoded by the video encoding unit 13 into IP packets, and produces the packets as individual video streams. In other words, as shown in FIG. 3 also, when a clipping operation is performed by the video clipping unit 12, the ROI video data on regions of interest is transmitted as a high priority video stream having a high priority for ensuring a transmission quality at the time of handover or when the communication quality is poor. On the other hand, the non-ROI data on regions of non-interest is transmitted as a low priority video stream having a low priority.

Each image (I picture, for example) of the non-ROT video data forwarded from the video encoding unit 13 to the video transmission unit 14 is given with a prescribed image size, and is converted into packets each attached by a RTP header, a UDP header and an IUP header as shown in FIG. 5(A), for example. Each image (1 picture, for example) of the ROI video data forwarded from the video encoding unit 13 to the video transmission unit 14 is attached by position information, and is converted into packets each attached with a RTP header, a UDP header and an IUP header as shown in FIG.

5(B), for example. It is also possible to transmit high priority video streams preferentially by using a QoS (quality of service) guarantee scheme such as the differentiated services.

A first wireless communication unit 15 performs a wireless communication based on a wireless LAN communication standard such as IEEE 802.11a/b/g with the access point APT via an antenna not shown in the drawings. The video data converted into IP packets by the video transmission unit 14 is transmitted from the first wireless communication unit 15 to the PC 3 via the access point AP1. Here, the ROT video data and the video data (non-ROI video data) produced from the image capturing unit 11 are transmitted as individual video streams. The first wireless communication unit 15 is capable of detecting the intensity of the reception signal as a measure of the quality of the wireless communication.

The second wireless communication unit 16 is provided with a structure and functions similar to those of the first wireless communication unit 15. The second wireless communication unit 16 periodically detects an access point (the access point AP2 in this case) which is different from the access point (the first access point AP1 in this case) with which the first wireless communication unit 15 is communicating with, and could be a handover target access point, and performs a wireless communication with the access point serving as a candidate for a handover target access point. Upon detecting an access point that could be a handover target access point, the second wireless communication unit 16 measures the reception signal intensity, and if there are two or more candidates for the handover target access point, selects the access point AP2 demonstrating the highest reception signal intensity according to the measurement of the reception signal intensity at the time of the handover that may follow.

Once the handover is performed for the wireless camera 2 from the access point AP1 to the access point AP2, the first wireless communication unit 15 and the second wireless communication unit 16 interchange the functions.

A communication control unit 17 controls not only the first wireless communication unit 15 and the second wireless communication unit 16 but also controls the communication by the entire wireless video communication system 1 in a comprehensive manner. In the communication control unit 17, a transmission control unit 18 controls the transmission of various sets of video data to the PC 3 by controlling the operation of the video clipping unit 12 and the video encoding unit 13. A transmission mode determining unit 19 selects an operation mode for the wireless camera 2 to use for achieving a transmission of high quality video data according to the quality of the wireless communication and the existing handover status from a plurality of operation modes. The transmission control unit 18 is caused to control the transmission of various sets of video data according to the determined operation mode.

Meanwhile, a network communication unit 21 of the PC 3 on the signal receiving side is connected to the access points AP1 and AP2 via the IP network 4 so as to perform a transmission/reception of video streams and various pieces of control information with the wireless camera 2 by using a per se known protocol such as the TCP/IP protocol.

A video reception unit 22 is provided with a buffering function for storing reception data, and forwards to a video decoding unit 23 the coded video data contained in the IP packets received by the network communication unit 21 from the wireless camera 2. The video decoding unit 23 decodes various sets of video data from the video reception unit 22. The decoded ROI video data and the corresponding non-ROI data are combined by a video combining unit 24 as required. The video data acquired in this manner is displayed on a video display unit 25 incorporated with a LCD panel or the like.

During a handover process, the position of the region of interest that is displayed on the video display unit 25 may be fixed. In such a time, the display position of the region of interest may be designated from the wireless camera 2 when transmitting the high priority video stream. Thereby, the user may be notified that the handover process is in progress, and will find easier to identify the region of interest selected for the handover process. Whether the fixing of the position of the region of interest is required or not may be determined in dependence on the intensity of the reception signal from the wireless camera 2. For instance, the position of the region of interest may be fixed only when the reception signal intensity is smaller than a prescribed threshold value. When the reception signal intensity is great, the position of the region of interest may not be fixed so that a natural-looking video display may be enabled.

A reception control unit 26 controls the reception of video data and the display operation by the PC 3 by controlling the operation of the video decoding unit 23 and the video combining unit 24. A stream selection unit 27 selects a video stream that is to be decoded by the video decoding unit 23 according to the reception condition of the various video streams in cooperation with the reception control unit 26 when a plurality of similar video streams are received by the video reception unit 22 (or when similar video streams are received from the first and second wireless communication units 15 and 16 of the wireless camera 2).

The PC 3 is provided with a CPU (central processing unit), ROM (read only memory), RAM (random access memory) and input and output interfaces, and performs a part or a whole of the functions mentioned above by executing prescribed application software.

The communication control unit 17 of the wireless camera 2 determines how each of the first and second wireless communication units 15 and 16 is to operate in the transmission of each video stream. This process of determining how each video stream should be transmitted by the communication control unit 17 is implemented by selectively performing one of three operation modes specified in the following.

The three operation modes of the wireless camera 2 includes a single stream mode, a two-stream mode A and a two-stream mode B. In the single stream mode, the captured image video data produced from the image capturing unit 11 is transmitted from the first wireless communication unit 15 to the access point AP1 as a single video stream. In the two-stream mode A, both the high priority video stream containing ROI video data and the low priority video stream containing non-ROI video data are transmitted from the first wireless communication unit 15 to the access point AP1 (without handover). In the two-stream mode B, both the high priority video stream containing ROI video data and the low priority video stream containing non-ROI video data are transmitted from the first wireless communication unit 15 to the access point AP1, and only the high priority video stream containing ROI video data is transmitted from the second wireless communication unit 16 to the access point AP2 (with handover).

Figure 6:
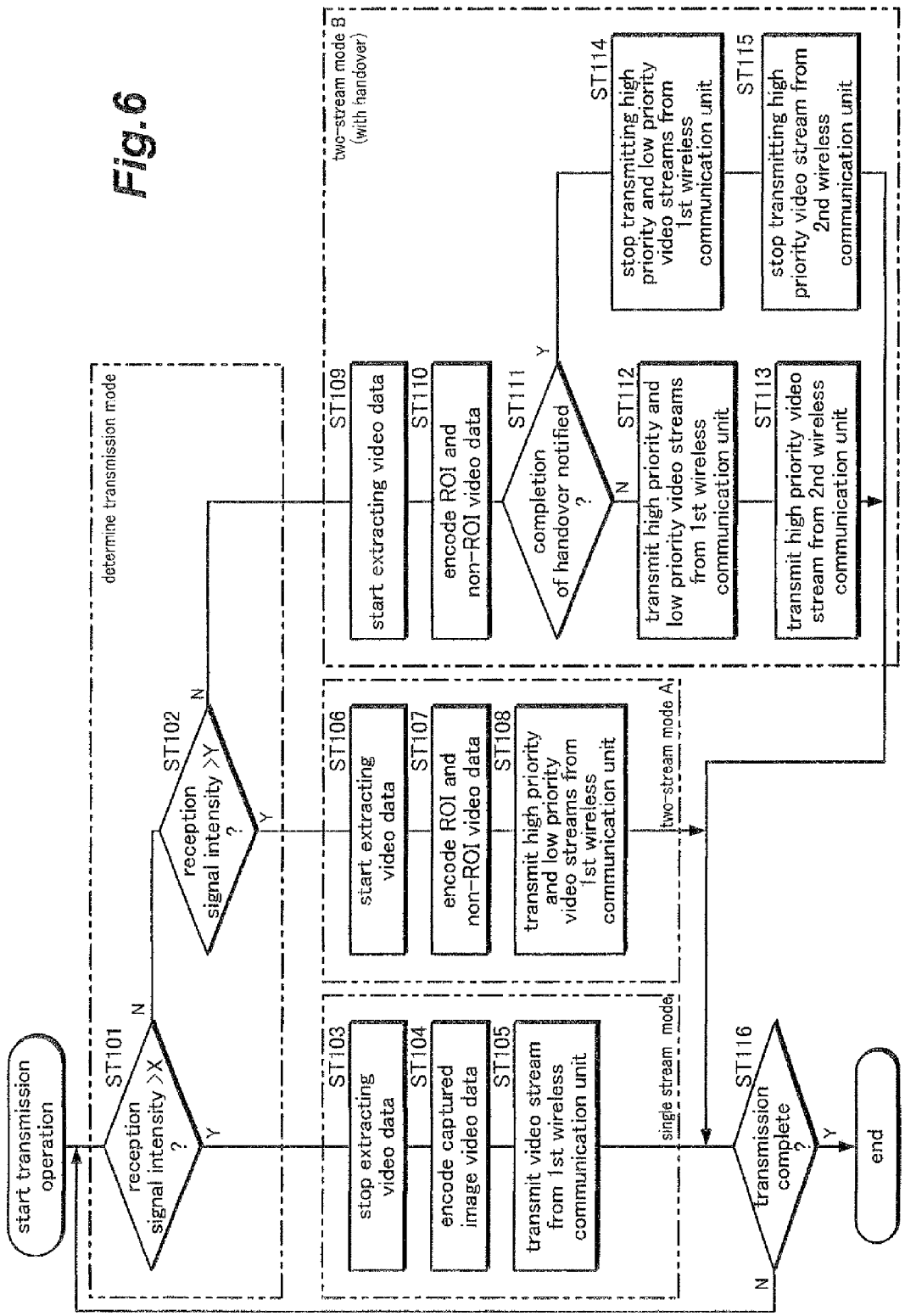
FIG. 6 is a flowchart showing the transmission operation of a video stream by the wireless camera 2.
Figure 7:
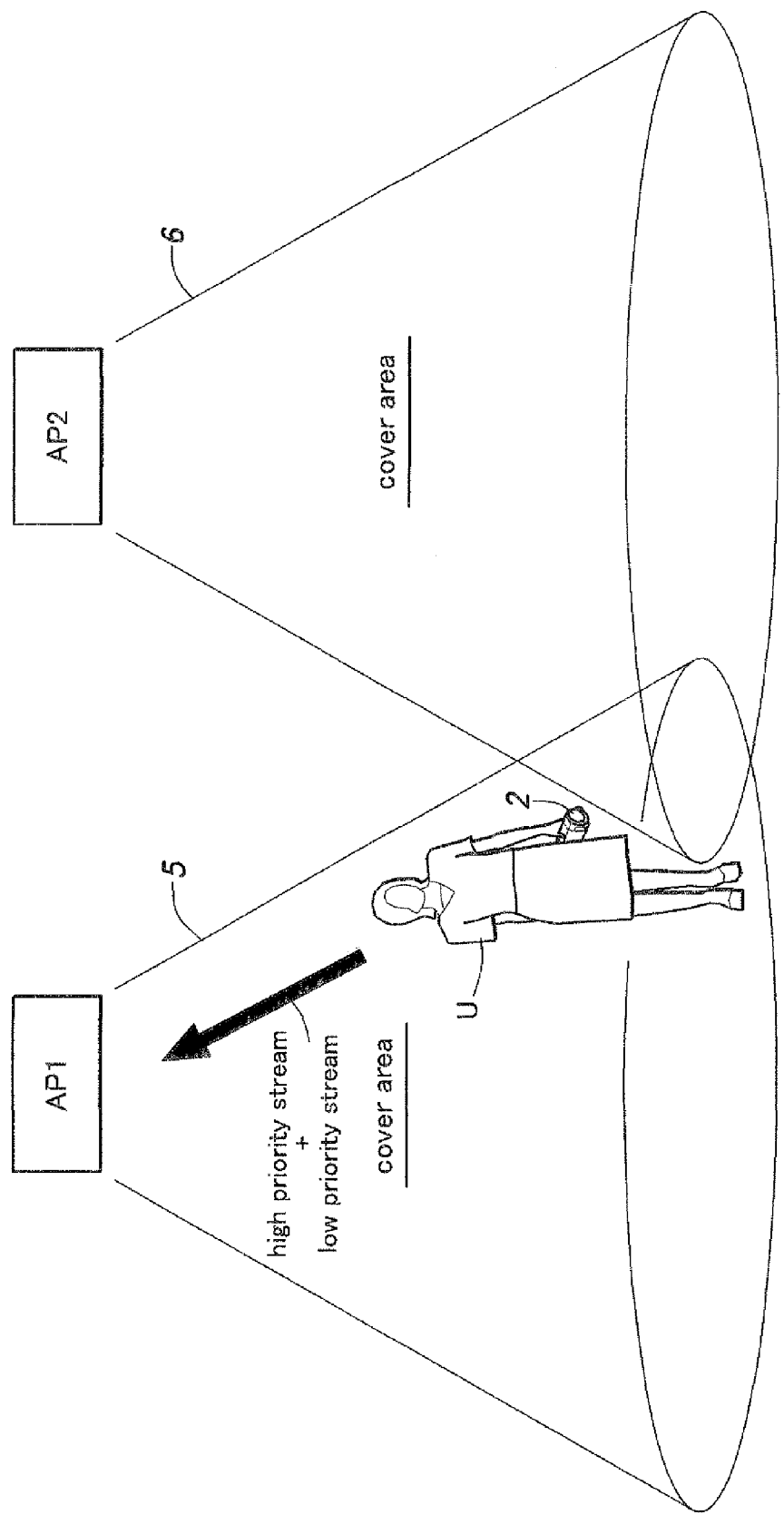
FIG. 7 is a diagram showing the mode of video stream transmission of the wireless camera 2 in the two-stream mode A (without handover)
Figure 8:
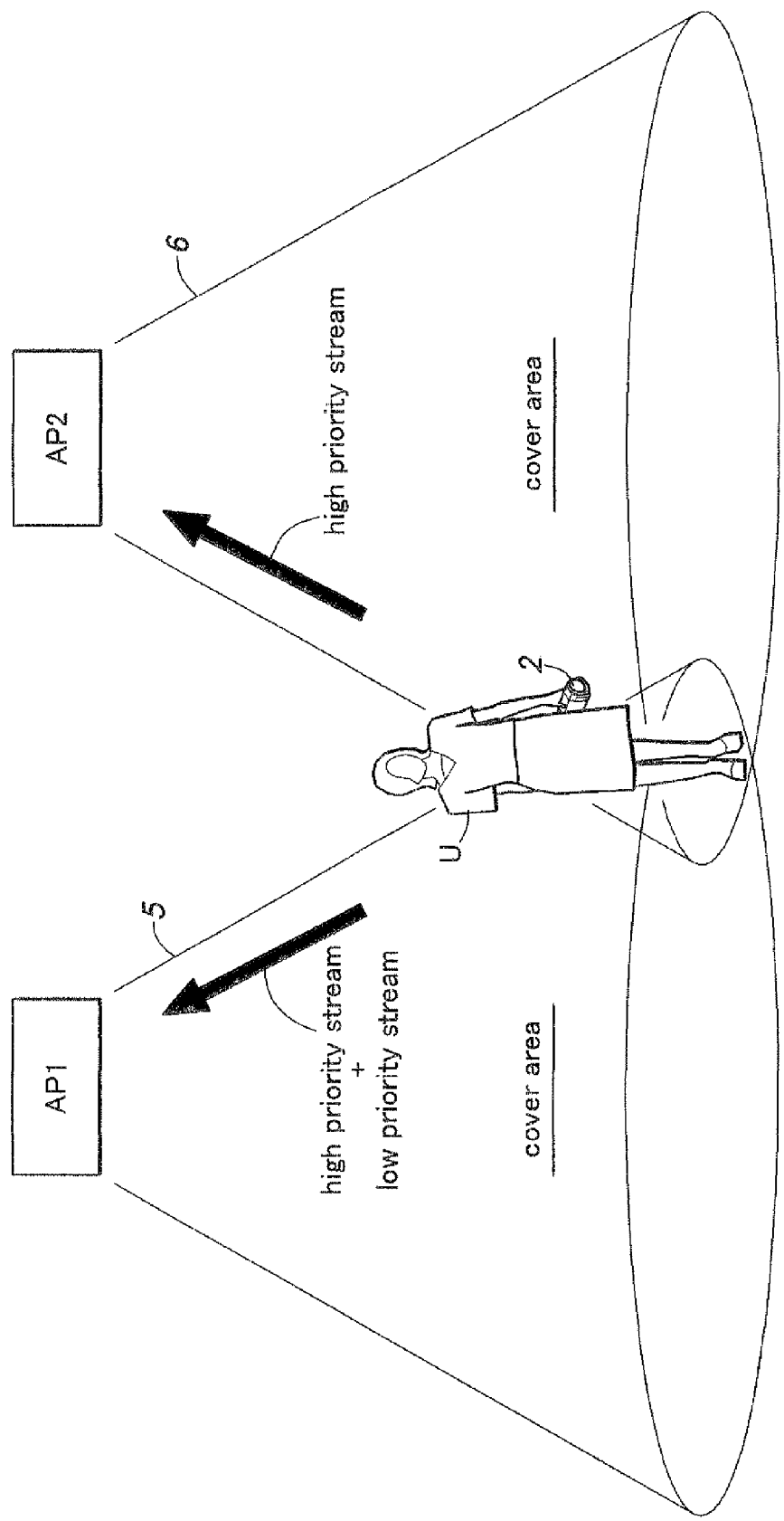
FIG. 8 is a diagram showing the mode of video stream transmission of the wireless camera 2 in the two-stream mode B (with handover)

FIG. 6 is a flowchart showing the transmission operation of a video stream by the wireless camera 2, FIG. 7 is a diagram showing the mode of video stream transmission of the wireless camera 2 in the two-stream mode A (without handover), and FIG. 8 is a diagram showing the mode of video stream transmission of the wireless camera 2 in the two-stream mode B (with handover).

Upon startup of the wireless camera 2, the first wireless communication unit 15 is connected to the access point AP1 corresponding to the cover area 5 in which the wireless camera 2 is currently located as shown in FIG. 1. Meanwhile, the second wireless communication unit 16 (which is not currently required to operate, and is to communicate with the access point AP2 or the handover destination access point at a later time point) detects the reception signal intensity of the access point AP1. Alternatively, the first wireless communication unit 15 may be configured to detect the reception signal intensity of the access point AP1.

If the detected reception signal intensity is higher than a predetermined first reference value X (ST101: Yes), the transmission control unit 19 judges that the wireless communication quality is favorable, and executes the single stream mode. If the detected reception signal intensity is lower than a predetermined first reference value X (ST101: No) and is higher than a second reference value Y (ST102: Yes), the transmission control unit 19 judges that the wireless communication quality is less than desired, and executes the two-stream mode A. If the detected reception signal intensity is lower than the second reference value Y (ST102: No), the transmission control unit 19 judges that the wireless communication quality is poor enough to perform a handover, and executes the two-stream mode B.

In the single stream mode (ST101: Yes), the video clipping unit 12 does not perform the clipping of regions of interest (ST103). Therefore, the captured image video data produced from the image capturing unit 11 is directly forwarded to the video encoding unit 13 to be encoded (ST104), and transmitted from the first wireless communication unit 15 to the PC 3 via the access point AP1 as a single video stream (ST105).

In the single stream mode, because the wireless camera 2 is located well within the cover area 5 of the access point AP1 (near the center thereof where the intensity of the radio wave is high), an adequate transmission bandwidth can be ensured as in a conventional transmission system even without reducing the amount of codes by clipping or otherwise extracting regions of interest.

In the two-stream mode A (ST102: Yes), the video clipping unit 12 extracts regions of interest (ST106). As a result, the ROI video data and the non-ROI video data are individually encoded by the video encoding unit 13 (ST107), and are transmitted from the first wireless communication unit 15 to the PC 3 via the access point AP1 as a high priority video stream and a low priority video stream, respectively (ST108).

In the two-stream mode A, although the wireless camera 2 is located where the intensity of the radio wave is relatively low within the cover area 5 of the access point AP1 (near the boundary of the cover area), a transmission of a high quality video data is ensured because one of the high priority video stream and the low priority video stream transmitted from the wireless camera 2 or both of them are available to the PC 3 as video data to be displayed.

In the two-stream mode B (ST102: No), steps ST109 and ST110 similar to the aforementioned steps ST106 and ST107 are executed. If a completion of the handover is not notified from the PC3 (ST111: No) at this time, the transmission control unit 18 executes step ST112 similar to the aforementioned step ST108, and only the high priority video stream is transmitted from the second wireless communication unit 16 to the PC3 via the access point AP2. If a completion of the handover is not notified within a prescribed time period predetermined by the user, the transmission control unit 18 may judge that the wireless camera 2 is not located in a position where a handover is possible (or outside of the cover areas of all the access points), and make an error notification to the user.

Upon receiving a handover completion notification from the PC 3 (ST111: Yes), the transmission control unit 18 stops the transmission of the high priority video stream and the low priority video stream from the first wireless communication unit 15 which was started in step ST112 (ST114). Then, the transmission control unit 18 causes the low priority video stream, in addition to the high priority video stream, to be transmitted from the second wireless communication unit 16 to the PC 3 via the access point AP2 (ST115).

In the e two-stream mode B, the wireless camera 2 is located on the boundary of the cover areas 5 and 6 where the two cover areas overlap each other as shown in FIG. 8. However, because the high priority video signal with a reduced amount of codes is being transmitted to the handover destination access point or the second access point AP2, the transmission of a high quality video data can be ensured even during the process of the handover. Because one of the high priority video stream and the low priority video stream transmitted from the wireless camera 2 or both of them are available to the PC 3 as video data to be displayed, the transmission of a high quality video data is ensured even when the wireless communication should deteriorate in the area near the cover area of the second access point upon completion of the handover.

The foregoing steps are repeated until the communication control unit 17 has judged that the entire transmission operation is finally completed (ST116: Yes).

Because the wireless camera 2 transmits the high priority video data and the low priority video data as individual video streams, and determines the need for transmitting each of the video stream depending on the quality of the wireless communication and the state of the handover process, the amount of codes can be individually controlled for each of the high priority video data and the low priority video data so that the range of the amounts of codes in the wireless communication that can be controlled can be expanded. Therefore, at the time of a handover or when the quality of the wireless communication at the boundary of the cover area of an access point has deteriorated, the garbling and deterioration of the video image can be minimized, and the transmission of a high quality video data is ensured.

It is also possible to stop only the transmission of the low priority video stream in step ST113 (or to transmit only the high priority video stream). In this case, the high priority video stream that is to be transmitted to the handover source access point AP1 may consist of the part of the video data (such as I pictures) different from the part of the video data that is to be transmitted to the handover destination access point. Thereby, the required transmission bandwidth for the handover source access point can be reduced. Further, by maintaining a part of the transmission of the video data to the handover source access point, the transmission of high quality video data can be maintained even when the handover is carried out back to the access point 1 once again.

It is also possible to transmit only the high priority video stream in step ST112. In this case, the video stream that is to be transmitted to the handover source access point AP1 may consist only a particular part of the video data (such as I pictures) different from the part to be transmitted to the handover destination access point. Thereby, the required transmission bandwidth for the handover source access point can be reduced.

In the foregoing embodiment, only the high priority video stream was transmitted from the second wireless communication unit 16 to the PC 3 in step ST113. If the transmission bandwidth required for the priority video stream is not available, and the low priority video stream requires a smaller amount of codes, only the low priority video stream may be transmitted. The modification of the embodiment in connection with step ST113 is described in the following with reference to FIG. 9.

FIG. 9 is a diagram showing the relationship between the two access points AP1 and AP2 and the reception signal intensity in the wireless video communication system 1, (A) representing the case where the distance between the access points is small, and (B) the case where the distance between the access points is large.

When the distance between the two access points AP1 and AP2 is relatively small, and the reception signal intensity in the overlapping area (hatched area) of the service areas of the access points is relatively high (or a relatively large bandwidth is available) as shown in FIG. 9(A), it is proper to transmit the high priority video stream. On the other hand, when the distance between the two access points AP1 and AP2 is relatively large, and the reception signal intensity in the overlapping area (hatched area) of the service areas of the access points is relatively low (or a relatively small bandwidth is available) as shown in FIG. 9(B), it is proper to transmit the low priority video stream. In this manner, even when the bandwidth is so small that the high priority video stream cannot be transmitted, the interruption of the video information can be avoided by transmitting the low priority video stream.

The transmission mode was selected in step ST101 and step ST102 by using the reception signal intensity of the first access point AP1, but it is also possible to use the reception signal intensity of the second access point AP2, instead. For instance, when the reception signal intensity of the second access point AP2 is greater than that of the first access point AP1, the transmission destination may be switched to the second access point while maintaining the single stream model, without involving either of the two-stream modes.

Figure 10:
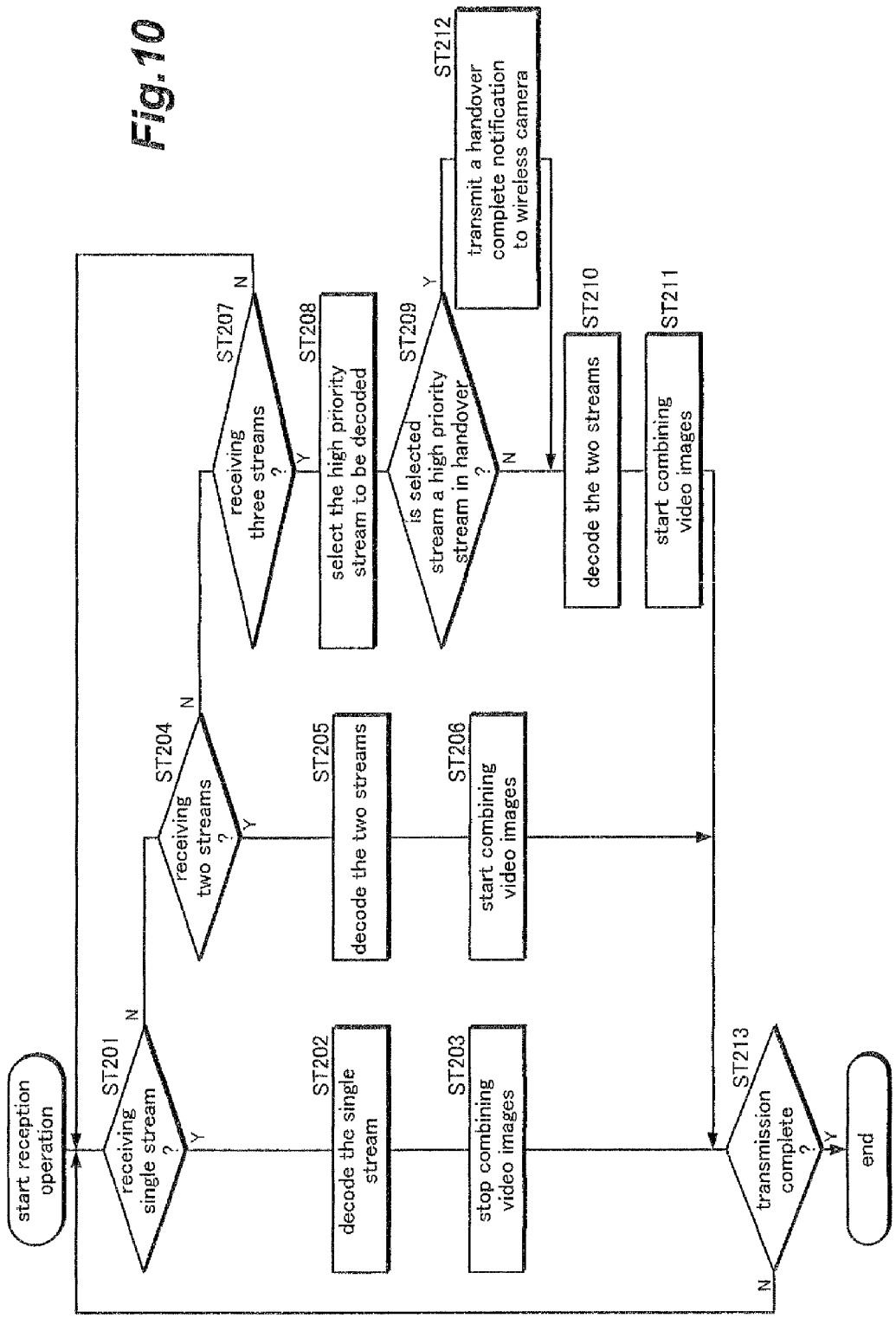
FIG. 10 is a flowchart showing the reception operation of video streams by the PC 3.

FIG. 10 is a flowchart showing the reception operation of video streams by the PC 3. Once the reception of the video stream is started in the PC 3, the stream selection unit 27 determines if the video reception unit 22 is receiving only a single video stream (ST201). If the single stream mode is being executed by the wireless camera 2 and only a single video stream is being received by the video reception unit 22 (ST201: Yes), the video stream is decoded by the video decoding unit 23 (ST202), and is directly displayed on the video display unit 25 without being subjected to a combining process by the video combining unit 24 (ST203).

If it is determined that it is not the case of receiving only a single video stream (ST201: No), the stream selection unit 27 further determines if two video streams are being received by the video reception unit 22 (ST204). Here, if the wireless camera 2 is executing the two-stream mode A, and two video streams are being received by the PC 3 (ST204: Yes), the two video streams are individually decoded by the video decoding unit 23 (ST205), and the decoded ROI video data and the corresponding non-ROI video data are combined by the video combining unit 24 (ST206) to be displayed on the video display unit 25.

If it is determined that it is not the case of receiving only two video streams in step ST204 (ST204: No), the stream selection unit 27 further determines if three video streams are being received (ST207). If the wireless camera 2 is executing the two-stream mode B, and three video streams are being received by the PC 3 (ST207: Yes), the stream selection unit 27 selects one of the two high priority video streams (video streams of the same kind) as the video stream to be decoded by the video decoding unit 23 according to the reception condition of each of the high priority video streams (as evaluated by using the packet loss ratio, the jitter fluctuation and other factors as an index) (ST208). As a result, the video information can be reproduced by selecting the video stream associated with a more favorable reception condition, and the transmission of a high quality video data is enabled. The frequency of the syntax errors in the decoding process may also be used as the index for evaluating the communication quality.

Then, the stream selection unit 27 determines if one of the high priority video streams selected in step ST208 is the one transmitted to the handover destination access point (ST209), and if it is not the case (ST209: No), steps ST210 and ST211 similar to steps ST205 and ST206 are executed. If one of the high priority video streams selected in step ST208 is the one transmitted to the handover destination access point (ST209: Yes), the reception control unit 26 transmits a handover completion notification to the wireless camera 2 to notify the wireless camera 2 of the completion of the handover before executing steps ST210 and ST211. (ST212). Thereby, the wireless camera 2 is fully informed of the timing of the completion of the handover so that the transmission of a high quality video data is ensured.

The foregoing steps are repeated until the reception control unit 26 has judged that the entire transmission operation is finally completed (ST213: Yes).

Although the present invention has been described in terms of a preferred embodiment thereof, it is obvious to a person skilled in the art that various alterations and modifications are possible without departing from the scope of the present invention.

The wireless video transmission device of the present invention is not limited to a wireless camera such as the one used in the foregoing embodiment, but may also consist of any other device as long as it is provided with the function of wireless communication and video data transmission. The wireless video reception device of the present invention is not limited to a PC such as the one used in the foregoing embodiment, but may also consist of any other device as long as it is provided with the function to receive video data from a wireless video transmission device and to decode the received video data.

The extraction of the regions of interest was performed in the foregoing embodiment such that high priority video data (ROI video data) and low priority data (non-ROI video data) having mutually different image regions are generated. However, high priority video data and low priority data having mutually different image resolutions may also be generated by using H.264 SVC or other scalable CODEC for the encoding of the video data. In this case, by appropriating controlling quantization values, as far as the high priority video data is concerned, the regions of interest may be encoded at a high image quality while the regions of non-interest are encoded at a low image quality. As for the low priority video data, the regions of interest may be encoded at a low image quality while the regions of non-interest are encoded at a high image quality.

The various components of the wireless video transmission device, the wireless video reception device and the wireless video communication system using these devices according to the present invention represented in the illustrated embodiment are not necessarily indispensable for the implementation of the present invention, but may also be omitted or altered without departing from the spirit of the present invention.

Industrial Applicability

The wireless video transmission device, the wireless video reception device and the wireless video communication system using these devices according to the present invention are highly useful as a wireless video transmission device, a wireless video reception device and a wireless video communication system using these devices that allow video signals to be transmitted and received via wireless communication by switching from one access point (base station) to another, and can avoid garbling and deterioration of video signals and ensure a high quality video communication even at the time of handover or poor communication quality which may occur at the boundary of the cover area of each access point.

Glossary 1 wireless video communication system
2 wireless camera (wireless video transmission device)
3 PC (wireless video reception device)
11 image capturing unit
12 video clipping unit
13 video encoding unit
15 first wireless communication unit
16 second wireless communication unit
17 communication control unit
23 video reception unit (data reception unit)
24 reception control unit (handover completion notification unit)
27 stream selection unit
AP1 first access point
AP2 second access point

The invention claimed is:

1. A wireless video transmission device, comprising:
a first wireless communication unit structured to communicate with a first access point;
a second wireless communication unit structured to communicate with a second access point serving as a candidate for a handover destination from the first access point; and
a communication control unit structured to control wireless communication operations of the first and second wireless communication units;
wherein the communication control unit determines if a transmission is to be made for each of the first and second wireless communication units according to a quality of communication with the first access point and a status of handover to the second access point, and transmits encoded high priority video data and low priority video data having at least one of mutually different image regions and mutually different image resolutions from the first and second wireless communication units, respectively, as two individual video streams comprising a high priority video stream and a low priority video stream,
wherein the communication control unit causes the high priority video stream and the low priority video stream to be transmitted from the first wireless communication unit to the first access point when the quality of communication does not meet a first reference criterion as to whether a transmission is to be made, and
wherein the communication control unit causes the high priority video stream to be transmitted from the second wireless communication unit to the second access point when the quality of communication does not meet a second reference criterion which is poorer than the first reference criterion.

2. The wireless video transmission device according to claim 1, wherein the communication control unit stops the transmission of the high priority video stream and the low priority video stream to the first access point and causes the second wireless communication unit to transmit the high priority video stream and the low priority video stream to the second access point upon completion of a handover from the first access point to the second access point.

3. A wireless video reception device structured to communicate with the wireless video transmission device according to claim 1, the wireless video reception device comprising:
a data reception unit structured to receive the high priority video stream and the low priority video stream transmitted from the wireless video transmission device via the first and second access points; and
a video decoding unit structured to decode video data contained in at least one of the received high priority video stream and the low priority video stream.

4. The wireless video reception device according to claim 3, further comprising a handover completion notification unit structured to notify a completion of a handover to the second access point to the wireless video reception device.

5. The wireless video reception device according to claim 3, wherein the data reception unit further comprises a stream selection unit structured to select a video stream to be decoded by the video decoding unit according to a reception condition of each video stream when a plurality of video streams of a same kind are received.

6. The wireless video reception device according to claim 3, further comprising a display unit structured to fix a display position of a high priority image during a handover depending on the quality of communication.

7. A method for executing a wireless video transmission in a wireless video transmission system, comprising the steps of:
acquiring a quality of communication with a first access point;
acquiring a status of handover to a second access point serving as a handover destination from the first access point; and
transmitting encoded high priority video data and low priority video data, respectively, as two individual video streams comprising a high priority video stream and a low priority video stream, the encoded high priority video data and low priority video data having at least one of mutually different image regions and mutually different image resolutions,
wherein the step of transmitting encoded high priority video data and low priority video data comprises transmitting the high priority video stream and the low priority video stream when the quality of communication does not meet a first reference criterion as to whether a transmission is to be made, and
wherein the step of transmitting encoded high priority video data and low priority video data comprises transmitting the high priority video stream when the quality of communication does not meet a second reference criterion which is poorer than the first reference criterion.

8. The method for executing a wireless video transmission according to claim 7, wherein the step of transmitting encoded high priority video data and low priority video data further comprises:
upon completion of handover from the first access point to the second access point, terminating transmission of the high priority video stream and the low priority video stream while maintaining transmission of the high priority video stream to the second access point.

9. A method for executing a wireless video reception in a wireless video reception system in receiving data transmitted from a wireless video transmission system by executing a method for a wireless video transmission, the method for a wireless video transmission comprising the steps of:

acquiring a quality of communication with a first access point;

acquiring a status of handover to a second access point serving as a handover destination from the first access point; and transmitting encoded high priority video data and low priority video data, respectively, as two individual video streams comprising a high priority video stream and a low priority video stream, the encoded high priority video data and low priority video data having at least one of mutually different image regions and mutually different image resolutions, wherein the method for executing a wireless video reception comprises the steps of:

receiving the high priority video stream and the low priority video stream via the first and second access points; and decoding video data from at least one of the received high priority video stream and the low priority video stream, wherein the step of transmitting encoded high priority video data and low priority video data comprises transmitting the high priority video stream and the low priority video stream when the quality of communication does not meet a first reference criterion as to whether a transmission is to be made, and wherein the step of transmitting encoded high priority video data and low priority video data comprises transmitting the high priority video stream when the quality of communication does not meet a second reference criterion which is poorer than the first reference criterion.

10. The method for executing a wireless video reception according to claim 9, further comprising the step of selecting one of the received high priority video stream and the low priority video stream that is to be decoded according to qualities of reception of the high priority video stream and the low priority video stream.

* * * * *